United States Patent [19]

Bledsoe, Jr. et al.

[11] 3,758,590

[45] Sept. 11, 1973

[54] HYDROLYZED DIELS-ALDER ADDUCTS OF OCIMENOL

[75] Inventors: James O. Bledsoe, Jr.; John M. Derfer, both of Jacksonville, Fla.

[73] Assignee: SCM Corporation, Cleveland, Ohio

[22] Filed: Nov. 24, 1969

[21] Appl. No.: 879,578

[52] U.S. Cl........... 260/598, 260/586 R, 260/340.3, 260/491, 252/522
[51] Int. Cl............................................. C07c 47/46
[58] Field of Search..................................... 260/598

[56] References Cited
UNITED STATES PATENTS

| | | | |
|---|---|---|---|
| 3,433,839 | 3/1969 | Moroe et al. | 260/598 |
| 2,947,780 | 8/1960 | Teegarden et al. | 260/598 X |
| 3,514,489 | 5/1970 | Lemberg | 260/598 |
| 1,944,732 | 1/1934 | Diels et al. | 260/598 |

*Primary Examiner*—Bernard Helfin
*Attorney*—Merton H. Douthitt and Thomas M. Schmetz

[57] ABSTRACT

Hydrolyzed Diels Alder adducts of ocimenol have been synthesized and found to have good olfactory and perfumery properties. The hydrolyzed adducts are made by reacting ocimenol and an $\alpha,\beta$-unsaturated carbonyl compound, preferably acrolein, methacrolein or crotonaldehyde, in a Diels-Alder reaction, followed by hydrolysis.

4 Claims, No Drawings

HYDROLYZED DIELS-ALDER ADDUCTS OF OCIMENOL

Adducts of myrcene and myrcenol with α,β-unsaturated aldehydes and ketones are known, and these adducts have been found to exhibit olfactory and perfumery properties. Examples include the adducts of myrcenol or myrcene with acrolein, methacrolein and crotonaldehyde.

Another product is a mixture of alicyclic hydroxy aldehydes. The structures of the products described in the prior art are as follows:

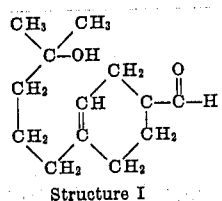
Structure I

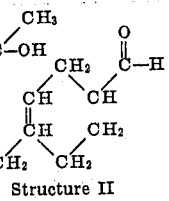
Structure II

Structure I is the Diels-Alder adduct of myrcenol and acrolein. Structure II is the Diels-Alder adduct of acrolein and a photo-oxidized, subsequently reduced myrcene product which forms an alicyclic hydroxy aldehyde. The compound represented by Structure I is sold under the trademark "Lyral" by International Flavors & Fragrances, Inc.

Ocimenol, when reacted with acrolein, methacrolein, crotonaldehyde and other α,β-unsaturated carbonyl compounds in a Diels-Alder reaction, does not form an adduct having perfumery properties, but forms a solid, odorless Diels-Alder adduct. But it has been found that when the adduct is hydrolyzed, the adduct converts to a product having good olfactory and perfumery properties. Unlike ocimenol, myrcenol does not form a solid, odorless product on reaction with an α,β-unsaturated carbonyl compound but readily converts to an adduct having olfactory properties.

Although not intending to be bound by theory, it is believed that ocimenol, when it reacts with an α,β-unsaturated dienophile carbonyl compound in a Diels-Alder reaction, forms a hemiacetal or hemiketal depending on whether the dienophile is an aldehyde or ketone. The hemiacetal, as stated before, is a solid at room temperature (70°F.) and substantially odorless. It is believed that because of the stereochemistry of the ocimenol molecule in the Diels-Alder reaction, the hydroxyl group inter-reacts with the aldehyde or ketone group to form the hemiacetal or hemiketal group. Because these groups interreact, they do not compliment each other as they do when separated. As a result the hemiacetal or hemiketal adducts do not possess desired olfactory properties. The configurations below represent what is believed to be the structure of the ocimenol acrolein hemiacetal adducts and include mixtures of both. Those skilled in the art should recognize the structure of the hemiketal from the hemiacetal from below:

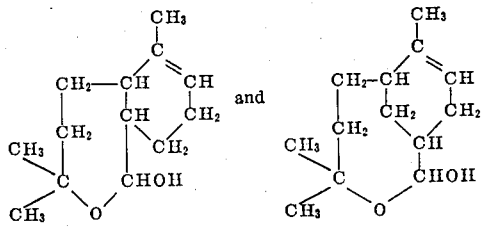
Hemiacetal forms of ocimenol and acrolein adduct

Ocimenol representing the diene in the Diels-Alder reaction is represented by the structure below:

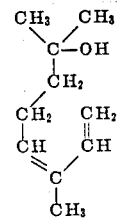
Cis and trans ocimenol

The α,β-unsaturated carbonyl compounds (dienophiles) of this invention are represented by the generic formula:

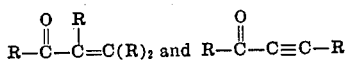

wherein R represents a hydrogen or methyl group. Examples of such dienophiles include crotonaldehyde, acrolein, methacrolein, propargyl aldehyde, methyl isopropenyl ketone, methyl vinyl ketone and the like. A dienophile aldehyde, selected from the group of acrolein, methacrolein and crotonaldehyde, is preferred in the reaction with ocimenol or its ester because the resulting products have good olfactory and perfumery properties and subsist for lengthy periods of time.

The Diels-Alder reaction is a well-known reaction for the 1,4 addition of a dienophile to a conjugated diene. Often the reactions are carried out between 0–150°C. In many instances the reaction is exothermic and heat must be removed rather than supplied. Those skilled in the art will appreciate the ramifications of this reaction and therefore it will not be discussed here.

Hydrolysis of the hemiacetal or hemiketal is accomplished by treatment with acid. Treatment with 10% aqueous or ethanolic solution at from 25°–100°C. is sufficient to cause hydrolysis of the hemiacetal or hemiketal. Acid treatment, though, should not be so strong as to cause dehydration of the alcohol group.

It has also been found that if the unsaturated hydrolyzed Diels-Alder adducts are hydrogenated to saturate the compound, the product exhibits good olfactory and perfumery properties. Because the aldehyde group is protected as a hemiacetal, the hydrogenation usually is accomplished prior to hydrolysis to prevent reduction of the aldehyde group. If hydrogenation is accomplished after hydrolysis, selective hydrogenation catalysts, such as palladium-on-charcoal, often are required for satisfactory hydrogenation.

To summarize, the reaction of ocimenol and a dienophile aldehyde, namely acrolein, followed by hydrolysis, is believed to be represented by the following:

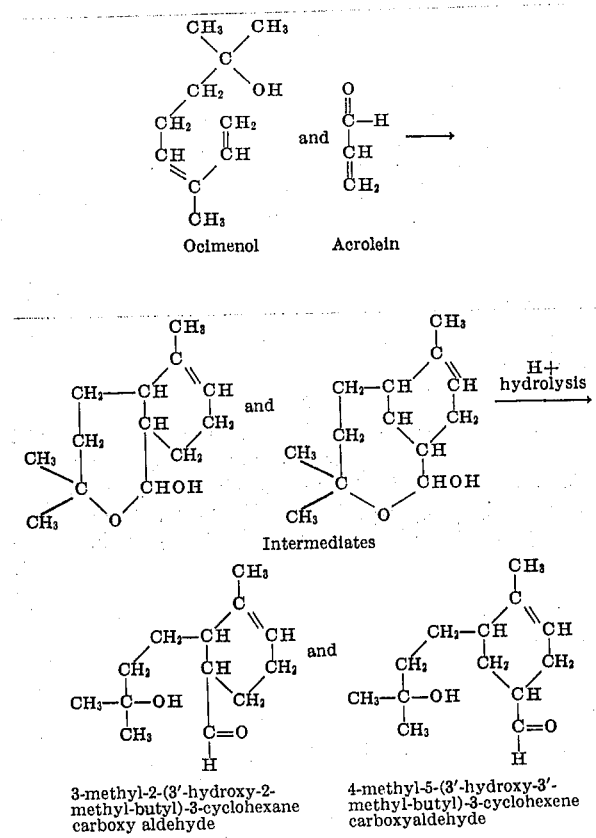

Another route for manufacturing the Diels-Alder adducts of ocimenol is by reacting a lower alkyl ester of ocimenol, such as ocimenyl acetate, in a Diels-Alder reaction in the presence of a dienophile, such as acrolein. The resulting compound formed is then reacted with a basic material, such as caustic soda, to saponify the ester, thus converting the ester to an alcohol. On hydrolysis, the ocimenol Diels-Alder adduct is obtained. To prevent reaction with the aldehyde as often results in the presence of caustic, the aldehyde ester prior to hydrolysis can be reacted with ethylene glycol to form the ethylene glycol acetal. This reaction is well known and involves reacting the aldehyde ester Diels-Alder adduct with ethylene glycol in a hydrocarbon solvent in the presence of an acidic catalyst. The reaction is usually conducted at reflux temperature while water is continuously removed from the distillate. The ethylene glycol acetal unit is converted back to the aldehyde group by hydrolyzing with acid.

The following examples are provided to illustrate specific embodiments of this invention and are not intended to restrict the scope thereof. All parts are parts by weight, all percentages are weight percentages, and all temperatures are in degrees Centigrade, unless otherwise specified.

EXAMPLE 1

Preparation of Diels-Alder Adducts of Ocimenol and Acrolein

One hundred parts of ocimenol, 42 parts of acrolein and one part of hydroquinone are charged to a vessel fitted with a mechanical stirrer, thermometer and reflux condenser and mixed. Hydroquinone is added to prevent any polymerization of the reactants or products. The mixed maerials are refluxed for a period of 24 hours. At the beginning of the reaction, the temperature is usually slightly above the reflux temperature of acrolein and then increases gradually to 140–170°. At the end of such reflux period, the heating is discontinued and the batch cooled to room temperature (70°F.). After strip distillation of the crude product at low pressure (0.5–2 mm Hg), 104 parts, (75% yield) based on original amount of ocimenol employed, of a solid, odorless product are obtained. No aldehyde absorption is detected on infrared analysis in a Nujol mull. On treatment with 500 parts of an ethanolic solution containing 10% aqueous hydrochloric acid, a hydrolyzed Diels-Alder adduct of ocimenol and acrolein is obtained and the hydrolyzed adduct has extremely pleasant perfumery properties. The product has a boiling point of 115–118° at 0.75 mm Hg.

EXAMPLE 2

A hydrolyzed Diels-Alder adduct of ocimenol and methacrolein is prepared by substituting 52.5 parts methacrolein for the acrolein used in Example 1 and by following the procedures set forth in Example 1. A product having perfumery properties is obtained.

EXAMPLE 3

A hydrolyzed Diels-Alder adduct of ocimenol and crotonaldehyde is obtained by substituting 52.5 parts of crotonaldehyde for the acrolein used in Example 1 and by following the procedures set forth in Example 1. A product having perfumery properties is obtained.

EXAMPLE 4

A saturated hydrolyzed Diels-Alder adduct of ocimenol and acrolein is obtained by forming the hemiacetal product by first charging 100 parts of the unhydrolyzed product of Example 1 to a pressure vessel. To the vessel is added 100 parts of toluene and 5 parts of a Raney nickel catalyst and the mixture heated to a temperature of about 100°C. Hydrogen is introduced into the vessel and pressure is raised in the vessel to 250 psi. Hydrogenation is continued for about two hours or until hydrogen is no longer absorbed. The material is filtered to remove the Raney nickel catalyst and the toluene is removed by distillation under reduced pressure. Seventy parts of a saturated Diels-Alder adduct are obtained after strip distilling the product under low vacuum (1 mm Hg). The hydrolyzed adduct is obtained by treating the saturated Diels-Alder adduct with an ethanolic solution containing 10% aqueous sulfuric acid.

EXAMPLE 5

One hundred parts of the purified hydrolyzed adduct of ocimenol and acrolein from Example 1 are charged to a pressure vessel with 100 parts of isopropanol and 10 parts of 5% palladium-on-carbon catalyst. Hydrogen is introduced to the vessel to a pressure of 60–100 psi and the vessel is heated to 100°C. After absorption of hydrogen is complete, the vessel is cooled and filtered to remove the catalyst. The solvent is removed under reduced pressure. The crude product is fractionated to give 95 parts of product with good olfactory properties.

What is claimed is:

1. The aldehyde product formed by refluxing ocimenol with an aldehyde reactant selected from the group consisting of acrolein, methacrolein and crotonaldehyde and hydrolyzing the intermediate product formed with an acid solution.

2. the aldehyde product of claim 1 wherein the aldehyde reactant is acrolein.

3. the aldehyde product of claim 1 wherein the aldehyde reactant is methacrolein.

4. the aldehyde product of claim 1 wherein the aldehyde reactant is crotonaldehyde.

* * * * *

PO-1050
(5/69)

UNITED STATES PATENT OFFICE
CERTIFICATE OF CORRECTION

Patent No. 3,758,590          Dated September 11, 1973

Inventor(s) James O. Bledsoe, Jr.; John M. Derfer

It is certified that error appears in the above-identified patent and that said Letters Patent are hereby corrected as shown below:

Column 1, lines 15-25, should read as follows:

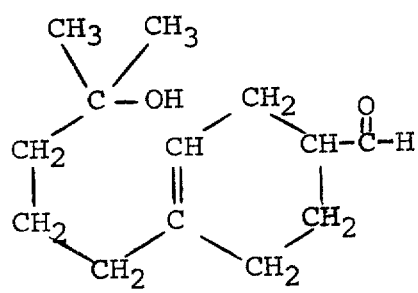  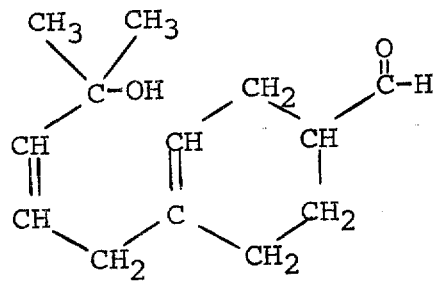

Structure I                    Structure II

Column 3, lines 19-28, right hand chemical formula should read as follows:

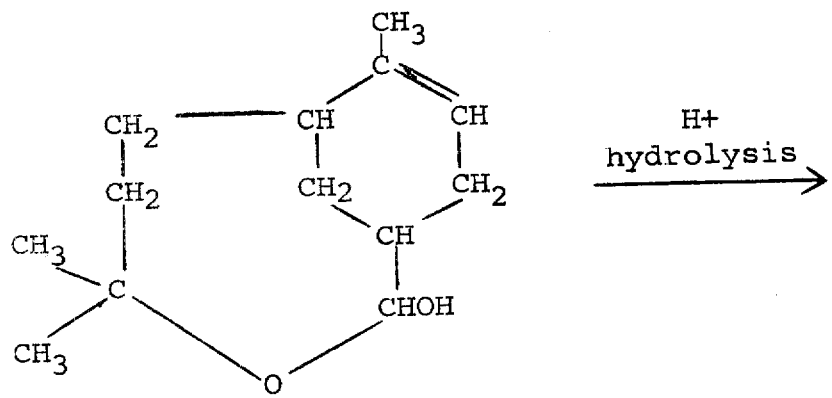

UNITED STATES PATENT OFFICE
CERTIFICATE OF CORRECTION

Patent No. 3,758,590　　　　　　　　Dated September 11, 1973

Inventor(s) James O. Bledsoe, Jr. ; John M. Derfer

It is certified that error appears in the above-identified patent and that said Letters Patent are hereby corrected as shown below:

Column 4, line 10, delete "maerials" and insert -- materials --

Signed and sealed this 16th day of April 1974.

(SEAL)
Attest:

EDWARD M. FLETCHER, JR.　　　　　　C. MARSHALL DANN
Attesting Officer　　　　　　　　　　Commissioner of Patents